US009611180B2

(12) United States Patent
Goujard et al.

(10) Patent No.: US 9,611,180 B2
(45) Date of Patent: Apr. 4, 2017

(54) METHOD FOR MANUFACTURING A PART MADE OF CMC

(71) Applicant: HERAKLES, Le Haillan (FR)

(72) Inventors: Stéphane Goujard, Merignac (FR); Eric Bouillon, Le Haillan (FR); Adrien Delcamp, Merignac (FR); Sébastien Bertrand, Moulis en Medoc (FR)

(73) Assignee: HERAKLES, Le Haillan (FR)

( * ) Notice: Subject to any disclaimer, the term of this patent is extended or adjusted under 35 U.S.C. 154(b) by 0 days.

(21) Appl. No.: 14/431,413

(22) PCT Filed: Sep. 13, 2013

(86) PCT No.: PCT/FR2013/052110
§ 371 (c)(1),
(2) Date: Mar. 26, 2015

(87) PCT Pub. No.: WO2014/049221
PCT Pub. Date: Apr. 3, 2014

(65) Prior Publication Data
US 2015/0251959 A1    Sep. 10, 2015

(30) Foreign Application Priority Data

Sep. 27, 2012   (FR) ...................................... 12 59139

(51) Int. Cl.
C23C 16/34 (2006.01)
C04B 35/80 (2006.01)
(Continued)

(52) U.S. Cl.
CPC .......... *C04B 35/806* (2013.01); *C04B 35/565* (2013.01); *C04B 35/571* (2013.01);
(Continued)

(58) Field of Classification Search
CPC .............................. C23C 16/045; C23C 16/342
(Continued)

(56) References Cited

U.S. PATENT DOCUMENTS 4,889,686 A    12/1989  Singh et al.
4,994,904 A    2/1991   Nakagawa et al.
(Continued)

FOREIGN PATENT DOCUMENTS

WO    WO 98/23555    6/1998
WO    WO 99/21805    5/1999
(Continued)

OTHER PUBLICATIONS

Written Opinion of the International Searching Authority as issued in International Patent Application No. PCT/FR2013/052110, dated Dec. 18, 2013.
(Continued)

*Primary Examiner* — Bret Chen
(74) *Attorney, Agent, or Firm* — Pillsbury Winthrop Shaw Pittman LLP

(57) ABSTRACT

A composite material part having a matrix made of ceramic, at least for the most part, is fabricated by a method including making a fiber preform from silicon carbide fibers containing less than 1 at % oxygen; depositing a boron nitride interphase on the fibers of the preform, deposition being performed by chemical vapor infiltration at a deposition rate of less than 0.3 µm/h; performing heat treatment to stabilize the boron nitride of the interphase, after the interphase has been deposited, without prior exposure of the interphase to an oxidizing atmosphere and before depositing matrix layer on the interphase, the heat treatment being performed at a temperature higher than 1300° C. and not less than the maximum temperature to be encountered subsequently until the densification of the preform with the matrix has been
(Continued)

completed; and thereafter, densifying the perform with a matrix that is made of ceramic, at least for the most part.

10 Claims, 1 Drawing Sheet

(51) Int. Cl.
    *C04B 35/571*     (2006.01)
    *C04B 35/584*     (2006.01)
    *C04B 35/628*     (2006.01)
    *C04B 35/565*     (2006.01)
    *C04B 35/583*     (2006.01)
    *C04B 41/00*     (2006.01)

(52) U.S. Cl.
    CPC .......... *C04B 35/583* (2013.01); *C04B 35/584* (2013.01); *C04B 35/62868* (2013.01); *C04B 35/62884* (2013.01); *C04B 41/0072* (2013.01); *C04B 2235/428* (2013.01); *C04B 2235/483* (2013.01); *C04B 2235/5244* (2013.01); *C04B 2235/614* (2013.01); *C04B 2235/616* (2013.01); *C04B 2235/723* (2013.01)

(58) Field of Classification Search
    USPC ....................................................... 427/249.2
    See application file for complete search history.

(56) References Cited

U.S. PATENT DOCUMENTS

| 5,015,540 | A | | 5/1991 | Borom et al. |
| 5,132,283 | A | * | 7/1992 | McCune ............... H01L 39/143 257/E39.018 |
| 5,225,367 | A | * | 7/1993 | Yamazaki ......... H01L 21/26546 257/E21.341 |
| 5,246,756 | A | | 9/1993 | All et al. |
| 5,398,639 | A | * | 3/1995 | Doll ......................... C30B 1/00 117/10 |
| 5,955,194 | A | * | 9/1999 | Campbell ............... C03C 3/045 427/255.24 |
| 5,965,266 | A | | 10/1999 | Goujard et al. |
| 6,040,008 | A | * | 3/2000 | Sacks ............... C04B 35/62281 427/226 |
| 6,194,067 | B1 | * | 2/2001 | Hamada .................. C01B 31/02 428/367 |
| 6,291,058 | B1 | * | 9/2001 | Goujard ................ C04B 35/565 428/293.4 |
| 2003/0180206 | A1 | * | 9/2003 | Miele ...................... C04B 35/52 423/290 |
| 2005/0233127 | A1 | * | 10/2005 | Steffier .................... B32B 18/00 428/292.1 |
| 2006/0035024 | A1 | * | 2/2006 | Landini ................. C04B 35/806 427/249.2 |
| 2006/0147692 | A1 | * | 7/2006 | Kmetz ............. C04B 35/62868 428/292.1 |
| 2009/0169873 | A1 | | 7/2009 | Louchet-Pouillerie et al. |
| 2010/0003504 | A1 | | 1/2010 | Louchet-Pouillerie et al. |
| 2010/0015428 | A1 | * | 1/2010 | Philippe ................ C04B 35/571 428/293.4 |
| 2010/0179045 | A1 | * | 7/2010 | Fry ....................... C04B 35/565 501/35 |
| 2011/0293828 | A1 | | 12/2011 | Eberling-Fux et al. |

FOREIGN PATENT DOCUMENTS

| WO | WO 2010/063946 A1 | 6/2010 |
| WO | WO 2010/072978 A1 | 7/2010 |

OTHER PUBLICATIONS

International Search Report as issued in International Patent Application No. PCT/FR2013/052110, dated Dec. 18, 2013.

S. Le Gallet et al., "Microstructural and microtextural investigations of boron nitride deposited from $BCl_3$-$NH_3$-$H_2$ gas mixtures," Journal of the European Ceramic Society 24 (2004) pp. 33-44.

\* cited by examiner

METHOD FOR MANUFACTURING A PART MADE OF CMC

CROSS REFERENCE TO RELATED APPLICATIONS

This application is the U.S. National Stage of PCT/FR2013/052110 filed Sept. 13, 2013, which in turn claims priority to French Application No. 1259139, filed Sept. 27, 2012. The contents of both applications are incorporated herein by reference in their entirety.

BACKGROUND OF THE INVENTION

The invention relates to fabricating parts out of compote material with a matrix that is made of ceramic, at least for the most part, which material is referred to herein as CMC.

A field of application of the invention is fabricating structural parts used in the hot portions of turbine engines, in particular aviation turbine engines, for example parts for turbines, after-bodies, or secondary nozzles.

More particularly, the invention relates to fabricating CMC parts having fiber reinforcement made up almost entirely of silicon carbide, i.e. also containing less than 1 atomic percent (at %) of oxygen, and impurities, if any, in the state of traces, which fibers are referred to below SiC fibers, together with an interphase made of boron nitride (BN) that is interposed between the fibers and the matrix.

Such an SiC fiber reinforced part may be fabricated by obtaining a fiber preform, forming a BN interphase coating on the fibers of the preform, and densifying the preform with a matrix that is made of ceramic, at least for the most part.

A fiber preform of shape close to the shape of a part that is to be fabricated may be obtained by shaping a fiber structure, e.g. a structure made by weaving SiC fiber yarns.

A BN interphase coating may be formed by chemical vapor infiltration (CVI), the preform being held in a desired shape by means of tooling or a shaper.

One such method of fabricating a CMC part is described in Document WO 98/23555. The BN interphase coating is formed by CVI on the SiC fibers from a reaction gas comprising boron trichloride $BCl_3$, ammonia $NH_3$, and gaseous hydrogen $H_2$. The CVI process is performed at a relatively low temperature of 700° C. under a relatively low pressure of 1.3 kilopascals (kPa), so as to obtain a BN interphase providing relatively strong bonding between the fibers and the interphase coating. Such a strong bond makes it possible to take advantage of the capacity of SiC fiber yarns for elastic deformation to obtain a CMC having a high elastic deformation limit, and thus being less susceptible to cracking under load.

Nevertheless, a BN interphase coating obtained under the above conditions is sensitive to oxidation and to moisture, which can lead to it being degraded after being exposed to an oxidizing or corrosive environment, thereby affecting the mechanical properties of the CMC.

It is known that a BN deposit obtained by CVI or by chemical vapor deposition (CVD) presents ability to withstand oxidation that can be improved by imparting a high degree of crystallization to the BN. That can be obtained by performing CVI or CVD deposition at a temperature that is "high", typically higher than 1300° C., or by subjecting a BN deposit that has been obtained by low temperature CVI to heat treatment at a higher temperature, typically higher than 1300° C.

When depositing a BN interphase by CVI on the fibers of a fiber preform, performing the CVI process at high temperature leads to a thickness gradient for the interphase, which gradient is more marked when the preform is thicker. BN deposition occurs preferentially in the vicinity of the outer surface of the preform with the reaction gas becoming depleted rapidly on diffusing into the core of the preform, thereby leading to thickness that is much smaller in the core of the preform than in the vicinity of its outer surface.

In order to avoid such an interphase thickness gradient, a first solution consists in depositing the BN interphase by CVI or CVD at high temperature on the SiC fiber yarns before making the preform. Nevertheless, the thickness of the interphase must then be small in order to conserve sufficient flexibility for the yarns to enable them to be subjected to textile operations such as weaving, and there is a high risk of such a thin interphase being damaged during such textile operations.

A second solution consists in depositing the BN interphase by CVI at "low" temperature, as in WO 98/23555, and in performing subsequent heat treatment. Nevertheless, and as explained in the publication by S. LeGallet et al. entitled "Microstructural and microtextual investigations of boron nitride deposited from $BCl_3$—$NH_3$—$H_2$ gas mixtures" (Journal of the European Ceramic Society 24 (2004), 33-44), it is possible to increase the degree of crystallization of a BN deposit by heat treatment only if the deposit contains oxygen, e.g. because it has been exposed to an oxidizing atmosphere before the heat treatment. Unfortunately, the presence of oxygen in a BN interphase of a CMC material raises problems, in particular because of the risk of reaction with the SiC fiber at high temperature and to the production of potentially undesirable volatile species (in particular SiO).

OBJECT AND SUMMARY OF THE INVENTION

An object of the present invention is to fabricate CMC parts with SiC fiber reinforcement having a strong fiber-matrix bond to produce parts presenting a high elastic deformation limit but without presenting the above-mentioned drawbacks.

This object is achieved by a method comprising:
  making a fiber preform from silicon carbide fibers containing less than 1 at % oxygen;
  depositing a boron nitride interphase on the fibers of the preform, deposition being performed by chemical vapor infiltration at a deposition rate of less than 0.3 micrometers per hour (μm/h);
  performing heat treatment to stabilize the boron nitride of the interphase, after the interphase has been deposited, without prior exposure of the interphase to an oxidizing atmosphere and before depositing matrix layer on the interphase, the heat treatment being performed at a temperature higher than 1300° C. and not less than the maximum temperature to be encountered subsequently until the densification of the preform with the matrix has been completed; and
  thereafter, densifying the preform with a matrix that is made of ceramic, at least for the most part.

Surprisingly, the Applicant has observed that such heat treatment, even if it does not lead to increased crystallization of the BN, imparts greater resistance to oxidation on the interphase, in particular by eliminating the presence of active sites where oxygen might otherwise be grafted. In addition, the heat treatment makes it possible to eliminate volatile species that would otherwise be released during densification of the preform because of the temperatures encountered, and that could then pollute the matrix or become trapped within the CMC. In addition, any risk of reaction between the SiC fibers and oxygen present in the interphase is eliminated.

The boron nitride interphase may be deposited at a deposition rate of less than 0.1 µm/h in order to further limit any risk of a significant interphase thickness gradient within the preform.

In an implementation of the method, the boron nitride interphase is deposited from a reaction gas mixture containing boron chloride $BCl_3$, ammonia $NH_3$, and gaseous hydrogen $H_2$, at a temperature of less than 800° C. and at a pressure of less than 5 kPa.

In another implementation of the method, the boron nitride interphase is deposited from a reaction gas mixture containing boron trifluoride $BF_3$, ammonia $NH_3$, and gaseous hydrogen $H_2$, at a temperature lower than 1050° C., and at a pressure less than 20 kPa.

The duration of the heat treatment may lie in the range 0.25 hours (h) to 4 h, and preferably in the range 0.5 h to 2 h.

In an implementation, the boron nitride interphase is formed with the preform being held in its shape by means of a shaping tooling, and after heat treatment, depositing at least one layer of ceramic on the interphase by chemical vapor infiltration in order to consolidate the preform held in the tooling, densification of the preform subsequently being continued after the consolidated preform has been extracted from the tooling.

The preform may be densified at least in part by:
chemical vapor infiltration, and/or
impregnating the preform with a ceramic precursor polymer, followed by pyrolysis; and/or
introducing carbon and/or ceramic powder into the preform and infiltrating a silicon-based metal in the molten state.

BRIEF DESCRIPTION OF THE DRAWING

Other features and advantages of the invention appear on reading the following description made by way of non-limiting indication with reference to the accompanying drawing, in which.

DETAILED DESCRIPTION OF IMPLEMENTATIONS

Figure 1:
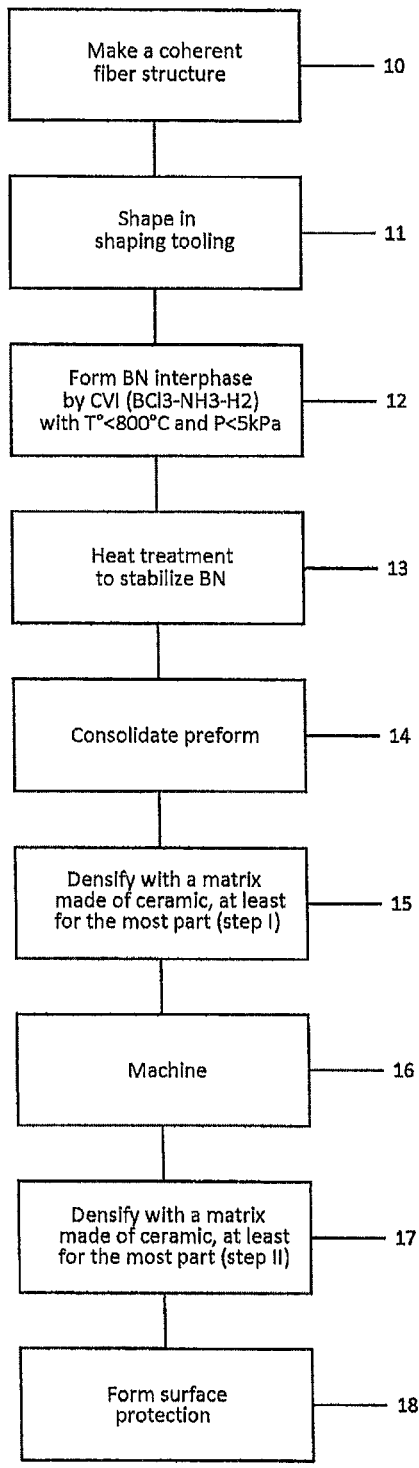
FIG. 1 is a flow chart specifying successive steps of an implementation of a method in accordance with the invention.

FIG. 1 shows successive steps of an implementation of a method of the invention for fabricating a CMC part.

In step 10, a coherent fiber structure is made from SiC fiber yarns as defined above. It is possible to use yarns supplied by the Japanese supplier Nippon Carbon under the reference "Hi-Nicalon" or, preferably, under the reference "Hi-Nicalon Type-S" having a higher elastic elongation limit. The term "coherent structure" is used herein to mean a structure that is possibly deformable while being capable of conserving its cohesion without assistance from support tooling or the equivalent. The fiber structure may be made by weaving, e.g. three-dimensional or multi-layer weaving. Other textile processes may be used, e.g. braiding or knitting.

In step 11, the fiber structure is shaped and held in shape by means of shaping tooling, in order to obtain a fiber preform of a shape that is close to the shape of the part that is to be fabricated. Examples of shaping fiber preforms from a coherent fiber structure can be found in particular in US patent application No. 2011/0293828.

In step 12, a BN interphase is formed on the SiC fibers by CVI, the preform being inserted together with its shaping tooling into a CVI oven. In well-known manner, it is possible to use tooling made of graphite that presents holes in order to facilitate the passage of the reaction gas during the CVI process.

The parameters of the CVI process, and in particular the temperature and the pressure inside the oven, and also the composition of the BN precursor reaction gas, are selected so as to have a limited deposition rate in order to encourage the gas to diffuse to the core of the preform and avoid any significant thickness gradient in the BN deposit across the thickness of the preform. The deposition rate is selected to be less than 0.3 µm/h, and preferably less than 0.1 µm/h.

For given parameters of the CVI process, the deposition rate can easily be determined by experiment, by measuring the thickness of a deposit formed on the surface of a testpiece, e.g. a monolithic block of SiC, as a function of the duration of the deposition stage. It can also be measured by taking the ratio of the thickness of the deposit as measured by examining a polished cross-section under an optical microscope or a scanning electron microscope, divided by the duration of the deposition stage.

When using a reaction gas mixture of the $BCl_3$—$NH_3$—$H_2$ type, the temperature is preferably selected to be less than 800° C., e.g. to lie in the range 650° C. to 800° C., and the pressure is selected to be less than 5 kPa, e.g. lying in the range 0.2 kPa to 5 kPa. When using a gas mixture of the $BF_3$—$NH_3$—$H_2$ type, the temperature is selected to be less than 1050° C., e.g. lying in the range 900° C. to 1050° C., and the pressure is selected to be less than 20 kPa, e.g. lying in the range 2 kPa to 20 kPa.

The thickness of the interphase lies on average in the range 0.1 micrometers (µm) to 1 µm, e.g. in the range 0.1 µm to 0.3 µm, it being observed that this thickness may vary in particular as a function of location relative to the holes in the shaping tooling. The deposit may be formed by continuous CVI, i.e. with the reaction gas flowing continuously through the oven, or by pulsed CVI, by performing successive cycles, each comprising introducing reaction gas into the oven, maintaining it therein for a predetermined duration, and then discharging the residual gas from the oven.

In step 13, heat treatment is performed to stabilize the interphase BN under an inert atmosphere, e.g. under argon, without prior exposure of the BN interphase to an oxidizing environment and prior to forming a layer of matrix on the BN interphase. The heat treatment is advantageously performed in the CVI oven immediately after the end of depositing the BN interphase. The purpose of the heat treatment is to stabilize the BN chemically by causing volatile species derived from the reaction gas and present in the BN deposit to degas and by eliminating the presence of active sites where oxygen could be come grafted if the interphase were to be exposed to an oxidizing environment while the part made of CMC is in use.

The temperature of the heat treatment is selected to be higher than 1300° C., e.g. lying in the range 1300° C. to 1450° C. This temperature is also selected to be not less than the maximum temperature subsequently encountered up to the end of fabricating the CMC part, in particular the maximum temperature to be encountered while densifying it with the matrix. As a result, any subsequent degassing of residual volatile species from the BN deposit is avoided, as might otherwise result from being exposed to a temperature higher than the heat treatment temperature, where such volatile species could then become trapped in the CMC, in particular at the interphase, or could pollute the matrix while it is being formed, thereby affecting the properties of the CMC.

The duration of the heat treatment, i.e. the time during which the specified temperature is maintained, preferably lies in the range 0.25 h to 4 h, and more preferably in the range 0.5 h to 2 h.

In step 14, after heat treatment, with the preform still held in the shaping tooling in the CVI oven, a layer of ceramic matrix is formed on the BN interphase by CVI in order to consolidate the preform, i.e. in order to bond the fibers of the preform together sufficiently to enable the preform to conserve its shape without assistance from the shaping tooling. This matrix layer may be made of SiC, for example. It should be observed that the formation of a matrix layer for consolidating the preform might be unnecessary if the BN interphase suffices for consolidation purposes.

After consolidation, the consolidated preform may be withdrawn from the shaping tooling (step 15) in order to be densified by a matrix that is at least essentially made of ceramic. The densification may be performed in two steps 16 and 18 that are separated by a step 17 of machining the part to its desired final shape. The following known densification processes may be used:

forming a matrix by CVI as a single layer or as a plurality of superposed layers;

forming a matrix by a liquid technique known as polymer infiltration and pyrolysis (PIP) with a plurality of cycles, each comprising impregnation with a liquid composition containing at least one ceramic precursor, followed by pyrolysis; and forming a ceramic matrix by impregnating with a slip containing one or more carbon or ceramic powders, e.g. SiC or $Si_3N_4$, known as a slurry casting (SC), followed by drying and infiltration with fused silicon or with a molten alloy containing a majority of silicon, known as melt infiltration (MI).

The use of CVI to form ceramic matrix layers of SiC, $B_4C$, or Si—B—C is described in particular in U.S. Pat. Nos. 5,246,756 and 5,965,266.

The ceramic precursor for PIP densification may be an organo-silicon compound such as a polysilazne, polysiloxane, polycarbosilane, or silicone resin.

A densification process by an MI technique is described in particular in U.S. Pat. Nos. 4,889,686, 4,994,904, and 5,015,540. Under such circumstances, when selecting the temperature for heat treatment, it is necessary in particular to take account of the fact that the MI process with infiltration of molten silicon takes place at a temperature that is generally not less than 1420° C., which temperature may nevertheless be a little lower when using a silicon-based alloy.

The two densification steps may be performed using the same process or by using different processes.

Finally, in step 19, the outer surface of the part or a portion of the outer surface, may be coated in a layer of ceramic "paint" or of an environmental barrier coating (EBC) having a thermal protection function and/or a function of providing protection against corrosion in an oxidizing and/or wet environment. Reference may be made in particular to the following patent applications: WO 2010/063946, WO 2010/072978, US 2009/0169873, and US 2010/003504.

Figure 2:
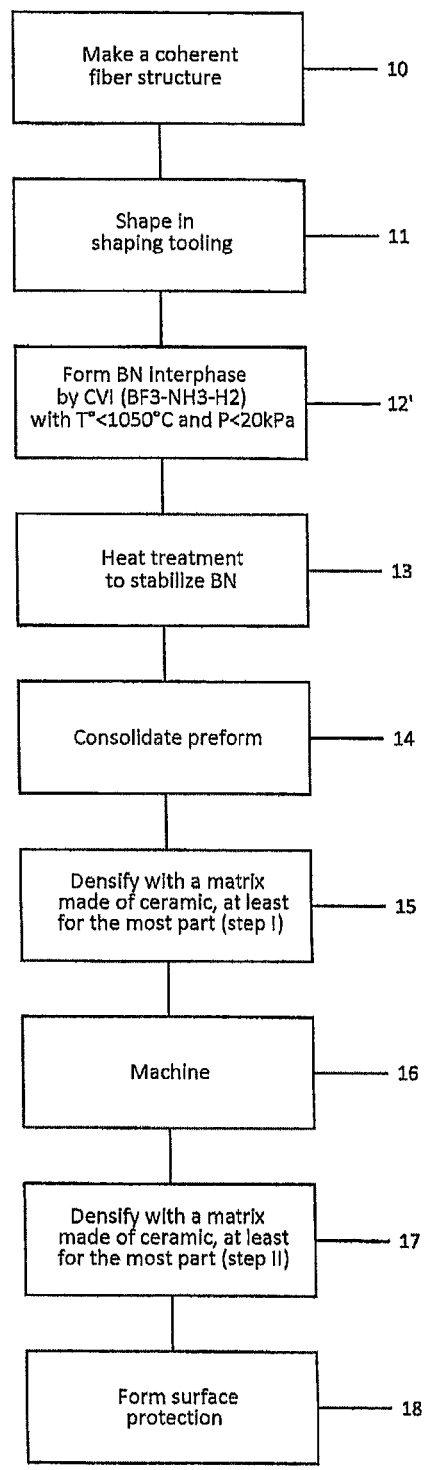
FIG. 2 is a flow chart specifying successive steps of another implementation of a method in accordance with the invention.

The method of FIG. 2 differs from that of FIG. 1 merely in that step 12' of forming the BN interphase by CVI is performed using a reaction gas mixture of the $BF_3$—$NH_3$—$H_2$ type, while the other steps 10, 11, and 13 to 19 are similar to those of the method of FIG. 1. The CVI process is performed at a temperature that is preferably less than 1050° C., e.g. lying in the range 900° C. to 1050° C., and the pressure is preferably selected to be less than 20 kPa, e.g. lying in the range 2 kPa to 20 kPa.

The invention claimed is:

1. A method of fabricating a composite material part having a matrix, the majority of said matrix being made of ceramic, the method comprising:

making a fiber preform from silicon carbide fibers containing less than 1 at % oxygen;

depositing a boron nitride interphase on the fibers of the preform, deposition being performed by chemical vapor infiltration at a deposition rate of less than 0.3 μm/h so as to obtain coated fibers;

performing heat treatment of the thus obtained coated fibers, only after the end of the deposition of the boron nitride interphase, without prior exposure of the interphase to an oxidizing atmosphere and before depositing matrix layer on the interphase, the heat treatment allowing to stabilize the boron nitride of the interphase, the heat treatment being performed on the coated fibers which comprise the fibers and the boron nitride interphase and which are deprived of any matrix layer deposited on the boron nitride interphase, the heat treatment being performed at a temperature higher than 1300° C. and not less than a maximum temperature to be encountered subsequently until a densification of the preform with the matrix has been completed; and thereafter, densifying the preform with the matrix.

2. A method according to claim 1, wherein the boron nitride interphase is deposited at a deposition rate of less than 0.1 μm/h.

3. A method according to claim 1, wherein the boron nitride interphase is deposited from a reaction gas mixture containing boron chloride $BCl_3$, ammonia $NH_3$, and gaseous hydrogen $H_2$, at a temperature of less than 800° C. and at a pressure of less than 5 kPa.

4. A method according to claim 1, wherein the boron nitride interphase is deposited from a reaction gas mixture containing boron trifluoride $BF_3$, ammonia $NH_3$, and gaseous hydrogen $H_2$, at a temperature lower than 1050° C., and at a pressure less than 20 kPa.

5. A method according to claim 1, wherein the duration of the heat treatment lies in the range 0.25 h to 4 h.

6. A method according to claim 1, wherein the duration of the heat treatment lies in the range 0.5 h to 2 h.

7. A method according to claim 1, wherein the boron nitride interphase is formed with the preform being held in shaping tooling, and after heat treatment, depositing at least one layer of ceramic on the interphase by chemical vapor infiltration in order to consolidate the preform held in the tooling, densification of the preform subsequently being continued after the consolidated preform has been extracted from the tooling.

8. A method according to claim 1, wherein the preform is densified at least in part by chemical vapor infiltration.

9. A method according to claim 1, wherein the preform is densified at least in part by impregnating the preform with at least one ceramic precursor polymer and by pyrolysis.

10. A method according to claim 1, wherein the preform is densified at least in part by introducing carbon and/or ceramic powder into the preform and by infiltrating silicon-based metal in the molten state.

* * * * *